(12) United States Patent
Sekihara

(10) Patent No.: US 9,238,322 B2
(45) Date of Patent: Jan. 19, 2016

(54) MICROCHIP, MOLDING DIE FOR MICROCHIP, AND MANUFACTURING APPARATUS FOR MANUFACTURING MICROCHIP

(75) Inventor: Kanji Sekihara, Toyokawa (JP)

(73) Assignees: WAKO PURE CHEMICAL INDUSTRIES, LTD., Osaka (JP); KONICA MINOLTA, INC., Tokyo (JP)

( * ) Notice: Subject to any disclaimer, the term of this patent is extended or adjusted under 35 U.S.C. 154(b) by 252 days.

(21) Appl. No.: 13/882,352

(22) PCT Filed: Oct. 25, 2011

(86) PCT No.: PCT/JP2011/074478
§ 371 (c)(1),
(2), (4) Date: Apr. 29, 2013

(87) PCT Pub. No.: WO2012/057101
PCT Pub. Date: May 3, 2012

(65) Prior Publication Data
US 2013/0209733 A1 Aug. 15, 2013

(30) Foreign Application Priority Data

Oct. 29, 2010 (JP) ................................. 2010-243639

(51) Int. Cl.
| | |
|---|---|
| *B32B 3/24* | (2006.01) |
| *B29C 45/26* | (2006.01) |
| *B01L 3/00* | (2006.01) |
| *B32B 3/26* | (2006.01) |
| *B32B 3/30* | (2006.01) |

(52) U.S. Cl.
CPC ......... *B29C 45/263* (2013.01); *B01L 3/502707* (2013.01); *B29C 45/2628* (2013.01); *B32B 3/266* (2013.01); *B32B 3/30* (2013.01); *B01L2300/0816* (2013.01); *Y10T 428/24331* (2015.01)

(58) Field of Classification Search
CPC ................. B01L 3/502707; Y10T 428/24331
USPC ......................................................... 428/138
See application file for complete search history.

(56) References Cited

U.S. PATENT DOCUMENTS

| | | | | |
|---|---|---|---|---|
| 4,579,709 | A * | 4/1986 | Ferreri | 264/242 |
| 2009/0095037 | A1* | 4/2009 | Eisenhower et al. | 70/277 |

FOREIGN PATENT DOCUMENTS

| | | |
|---|---|---|
| JP | 2000-065795 | 3/2000 |
| JP | 2000-310615 A | 11/2000 |

(Continued)

OTHER PUBLICATIONS

International Search Report in International Application No. PCT/JP2011/074478 mailed Jan. 24, 2012, 2 pages.

(Continued)

*Primary Examiner* — William P Watkins, III
(74) *Attorney, Agent, or Firm* — Brinks Gilson & Lione

(57) ABSTRACT

A molding die for molding a substrate to be included in a microchip includes a first die and a second die contactable with and separable from the first die. One of the first die and the second die includes a ridge for molding the groove and a columnar first protrusion for molding at least a smallest diameter portion of a hole in the substrate, the portion having the smallest inner diameter. The other of the first die and the second die includes a second protrusion which is formed to be columnar having a diameter larger than the diameter of the first protrusion and contacts with a distal end of the first protrusion to mold the hole so as to extend through the substrate in cooperation with the first protrusion. A microchip also is provided.

9 Claims, 13 Drawing Sheets

(56) References Cited

FOREIGN PATENT DOCUMENTS

| | | |
|---|---|---|
| JP | 2008-224431 A | 9/2008 |
| WO | WO 2009/034819 A1 | 3/2009 |
| WO | WO 2010/110014 A1 | 9/2010 |

OTHER PUBLICATIONS

International Preliminary Report on Patentability in International Application No. PCT/JP2011/074478 mailed Apr. 30, 2012, and English language translation, 9 pages.

* cited by examiner

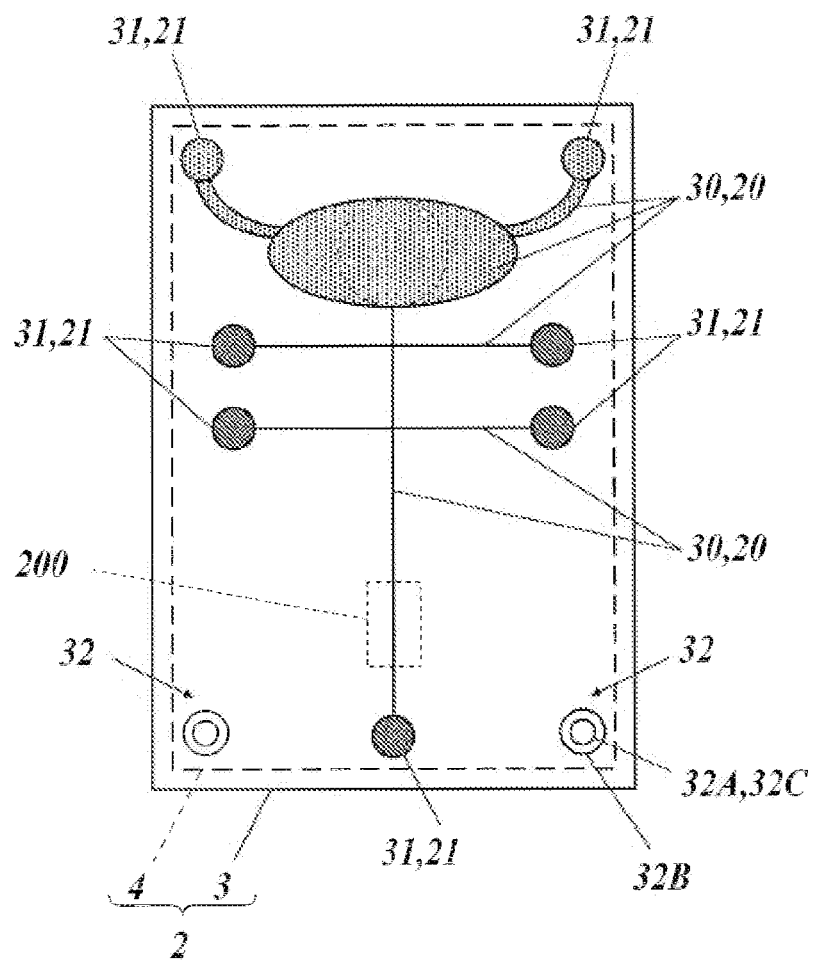

US 9,238,322 B2

MICROCHIP, MOLDING DIE FOR MICROCHIP, AND MANUFACTURING APPARATUS FOR MANUFACTURING MICROCHIP

This application is a National Stage application of International Application No. PCT/JP2011/074478, filed Oct. 25, 2011.

TECHNICAL FIELD

The present invention relates to a microchip, a molding die and a microchip manufacturing apparatus.

BACKGROUND

Conventionally, there has been practically used microchips (also referred to as micro analysis chips or micro fluid chips) or an apparatus called JAS (Micro Total Analysis Systems) using the microchips, wherein a fine flow fluid passage or a circuit is formed on a silicon or glass substrate by using fine processing technology and chemical reactions, separation, and analysis of a nucleic acid, a protein, and a liquid sample such as blood are conducted in a minute space. Such a microchip (also referred to as micro fluid chip) reduces the used amounts of samples and reagents and the discharge amount of waste fluid, thereby achieving a space-saving, portable, and inexpensive system.

A microchip is manufactured by attaching two members to each other, at least one of which is finely processed. Recently, a resin microchip has been proposed to facilitate low-cost production. More specifically, the resin microchip is manufactured by bonding a resin substrate having a fluid passage groove on the surface to a resin cover (e.g., a film) for covering the fluid passage groove. Through holes are formed at the ends of the fluid passage groove on the substrate across the thickness direction, for example. The substrate having the fluid passage groove on the surface is bonded to the cover with the fluid passage groove inside. The bonding allows the cover to function as a lid for the fluid passage groove, and thus the fluid passage groove and the cover form a fluid passage. Thereby, a microchip including a fluid passage inside is manufactured. The through holes formed in the substrate link the fluid passage to the exterior of the microchip, thereby allowing the introduction and discharge of a liquid specimen via the through holes.

In such a microchip, a reaction needs to be observed at a fixed position on a fluid passage even when the microchips are frequently replaced to be used. For this reason, as a technique for finding a position of an observation fluid passage, there has been recently developed a technique wherein a position finding groove is provided in a microchip and the position of the observation fluid passage is determined by scanning a light beam across the groove (e.g., see Patent Document 1). Alternatively, a position of an observation fluid passage can be determined by filling a positioning fluid passage provided at both sides of the observation fluid passage with a fluorescent substance, and identifying the position to determine the position of the observation fluid passage.

PRIOR ART DOCUMENTS

Patent Documents

Patent Document 1: Japanese Patent Application Laid Open Publication No. 2000-65795

BRIEF SUMMARY

Disclosure of the Invention

Problems to be Solved by the Invention

However, the above-described position finding groove and positioning fluid passage complicate the configuration of a microchip, leading to reduced flexibility of design.

The present invention has been made in view of such circumstances and an object of the present invention is to provide a microchip, a molding die for the microchip and a microchip manufacturing apparatus that allow for determination of a position of an observation fluid passage and improvement in the flexibility of design.

Means for Solving the Problem

In order to solve the above problem, according to one aspect of the present invention, there is provided a molding die for molding a substrate to be included in a microchip, wherein in the substrate, a fluid passage groove is formed on one surface and a hole as a positioning reference for the groove is formed so as to extend from the one surface across a thickness direction, the microchip is formed by attaching a cover to the one surface, the molding die includes a first die and a second die contactable with and separable from the first die, and one die of the first die and the second die which molds the one surface includes a ridge for molding the groove and a columnar first protrusion for molding at least a smallest diameter portion of the hole, the portion having the smallest inner diameter.

According to the second aspect of the present invention, there is provided a microchip manufacturing apparatus for manufacturing a microchip produced by attaching a cover to a substrate, wherein in the substrate, a fluid passage groove is formed on one surface and a hole as a positioning reference for the groove is formed so as to extend through the substrate across a thickness direction, and the molding die is provided as a molding die of the substrate.

According to the third aspect of the present invention, there is provided a microchip produced by attaching a cover to a substrate, wherein by the substrate being formed by molding, a fluid passage groove is formed on one surface and a hole as a positioning reference for the groove is formed so as to extend through the substrate across a thickness direction, the hole is formed by a first recess and a second recess communicating with each other, the first recess extending from the one surface of the substrate toward the other surface, the second recess extending from the other surface toward the one surface, and an inner diameter of the second recess is larger than an inner diameter of the first recess.

Effect of the Invention

According to the first aspect of the present invention, the substrate has a fluid passage groove formed on one surface and a hole as a positioning reference for the groove formed so as to extend from the one surface across a thickness direction. One die of the first die and the second die, which molds the one surface to be attached to the cover, includes a ridge which molds the groove and a columnar first protrusion which molds at least a smallest diameter portion of the hole, the portion having the smallest inner diameter. Thus, the smallest diameter portion of the hole, that is, a portion specified as a position of the hole and the fluid passage groove are molded by the same die. Accordingly, a positional relationship between the fluid passage groove and the smallest diameter portion of the hole can remain constant during the shots of molding; hence, the position of the observation fluid passage can be accurately determined on the basis of the position of the smallest diameter portion of the hole. Thus, a conventional positioning fluid passage is not necessary, which can improve the flexibility of design while maintaining the capability of finding the position of the observation fluid passage. In addition, each measurement does not need a process, such as focusing, for determining the position of the observation fluid passage, and thus the control for the microchip in use can be simplified to shorten inspection time.

According to the third aspect of the present invention, formed by molding, the substrate has a fluid passage groove which is formed on one surface to be attached to the cover and a hole as a positioning reference for the groove which is formed so as to extend through the substrate across the thickness, and the hole is formed by a first recess and a second recess communicating with each other, the first recess extending from the one surface of the substrate toward the other surface, the second recess extending from the other surface toward the one surface. Thus, when the substrate is molded, the fluid passage groove and the first recess are molded by one same die of the first die and the second die. Further, an inner diameter of the second recess is larger than an inner diameter of the first recess, and thus the smallest diameter portion of the hole exists in the first recess. Accordingly, a positional relationship between the fluid passage groove and the smallest diameter portion of the hole can remain constant during the shots of molding; hence, the position of the observation fluid passage can be accurately determined on the basis of the position of the smallest-diameter portion of the hole. Thus, a conventional positioning fluid passage is not necessary, which can improve the flexibility of design while maintaining the capability of finding the position of the observation fluid passage. In addition, each measurement does not need a process, such as focusing, for determining the position of the observation fluid passage, and thus the control for the microchip in use can be simplified to shorten inspection time.

BRIEF DESCRIPTION OF THE DRAWINGS

FIG. 3A This is a schematic plan view of a microchip.

DETAILED DESCRIPTION OF THE DRAWINGS AND THE PRESENTLY PREFERRED EMBODIMENTS

Embodiments for Carrying out the Invention

Figure 1:
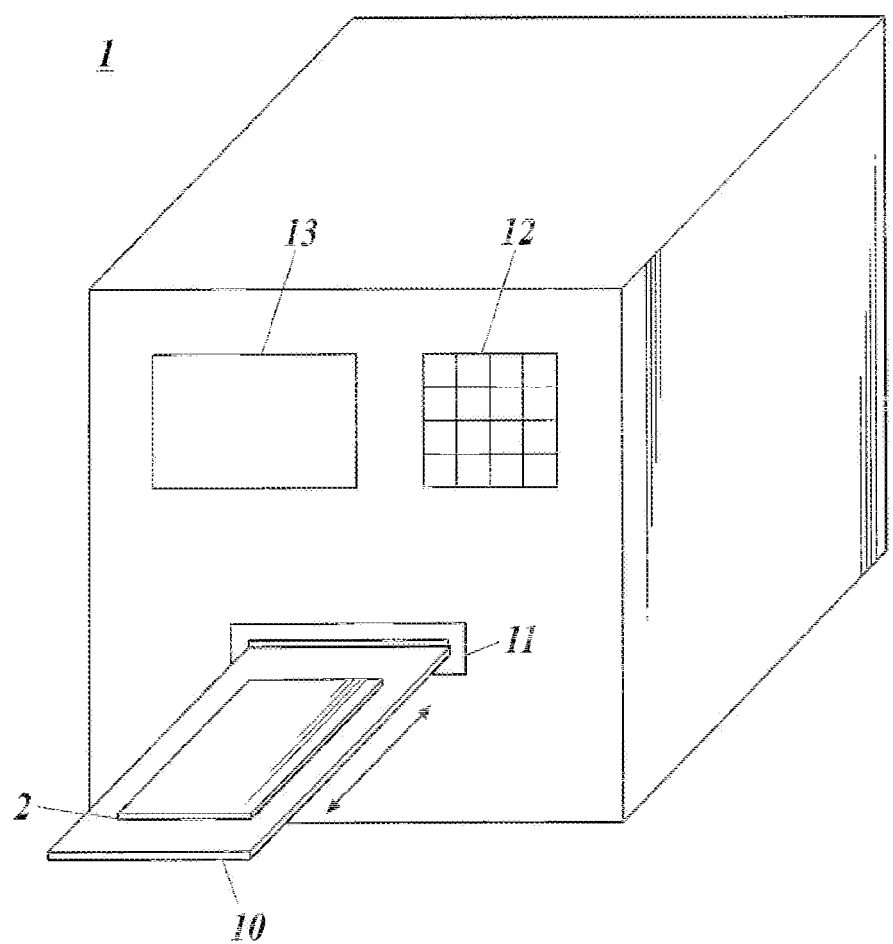
FIG. 1 This is an external view of an inspection apparatus.
Figure 2:
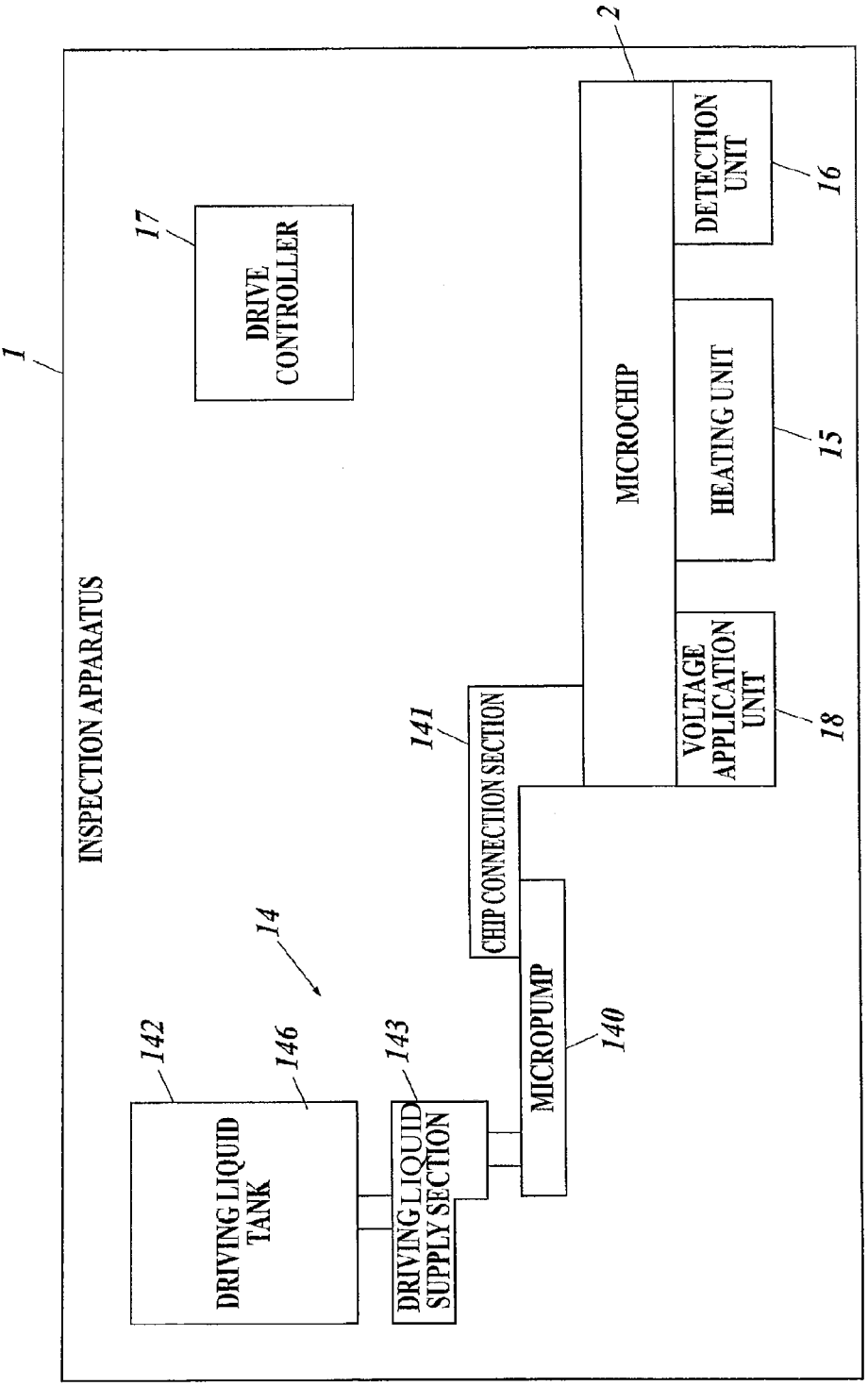
FIG. 2 This is a schematic internal view of the inspection apparatus.

The present invention will now be described on the basis of embodiments with reference to the accompanying drawings; however, this invention is not limited to the embodiments. Note that the same or similar parts are labeled with the same reference numerals throughout the drawings to omit redundant description thereof.
(1. Inspection Apparatus)
First, an inspection apparatus in an embodiment of the present invention will be described with reference to FIGS. 1 and 2.
FIG. 1 is a perspective view illustrating an example of external structure of the inspection apparatus 1, and FIG. 2 is a schematic view illustrating an example of internal structure of the inspection apparatus 1.
As illustrated in FIG. 1, the inspection apparatus 1 includes a tray 10 on which a microchip 2 is placed, an conveying slit 11 through which the microchip 2 on the tray 10 is conveyed by a loading mechanism (not shown in the drawings), an operation unit 12 for inputting data of, for example, details and a subject of the inspection is inputted, a display 13 for displaying the results of the inspection, and such like.
The inspection apparatus 1 also includes a fluid delivering unit 14, a heating unit 15, a voltage application unit 18, a detection unit 16, a drive controller 17 and such like as illustrated in FIG. 2.
(1-1. Fluid Delivering Unit)
The fluid delivering unit 14 is a unit for causing liquid to flow in the microchip 2 and is connected to the microchip 2 that is brought in the inspection apparatus 1 from the conveying slit 11. The fluid delivering unit 14 includes at least one micropump 140, a chip connection section 141, a driving liquid tank 142, a driving liquid supply section 143 and such like.

The fluid delivering unit 14 is provided with one or more micropumps 140 performing fluid delivery to and from the microchip 2 by injecting driving liquid 146 into the microchip 2 and sucking fluid, such as an assay sample, from the microchip 2. If a plurality of micropumps 140 are provided, the micropumps 140 can be driven independently or in conjunction with each other. If a medium, an analyte, a reagent, and other fluid are injected into the microchip in advance, fluid delivery by driving liquid is not always necessary and otherwise only the micropump may be operated to support the transfer of the medium. Alternatively, the micropump may be used exclusively for injection of a reagent and an analyte.

The micropump 140 is in communication with the microchip 2 via the chip connection section 141.

The driving liquid tank 142 holds the driving liquid 146 and supplies the driving liquid supply section 143 with the driving liquid 146. The driving liquid tank 142 can be replaced by detaching from the driving liquid supply section 143 for the replenishment of driving liquid 146.

The driving liquid supply section 143 supplies the micropump 140 with the driving liquid 146 from the driving liquid tank 142.

In the fluid delivering unit 14, the chip connection section 141 connects the microchip 2 to the micropump 140 to provide communication therebetween. The micropump 140 is then driven to inject or suck the driving liquid 146 into or from the microchip 2 through the chip connection section 141. At this time, a specimen, a reagent and such like contained in a plurality of containers in the microchip 2 flow in the microchip 2 with the aid of the driving liquid 146. Thereby, an objective substance is detected or a disease is determined as a result of the reaction of a mixed specimen and reagent in the microchip 2, for example.

(1-2. Heating Unit)

The heating unit 15 generates thermal energy to heat the microchip 2 to several specific temperatures. For example, the heating unit 15 heats the microchip 2 to a thermal denaturation temperature of approximately 95° C., an annealing temperature of approximately 55° C., and a polymerizing temperature of approximately 70° C. Such heating facilitates gene amplification through polymerase chain reaction (PCR). The heating unit 15 is configured by including an element that generates heat with electricity, such as a heater or a Peltier element, an element that lowers the temperature through water conduction, and such like.

(1-3. Voltage Application Unit)

The voltage application unit 18 has a plurality of electrodes. These electrodes are immersed in a liquid specimen in the microchip 2 to directly apply voltage to the liquid specimen or contacts current-carrying portions 40 described later to apply voltage to the liquid specimen via the current-carrying portions 40, and thereby the electrophoresis is run in the liquid specimen in the microchip 2.

(1-4. Detection Unit)

The detection unit 16 includes a light source, such as light-emitting diode (LED) or laser beams, and a light-receiving unit, such as photodiode (PD), and optically detects a target substance contained in the fluid generated through a reaction in the microchip 2 in a predetermined area (detection area 200, which is described below) on the microchip 2. The light source and the light-receiving unit are positioned in a transmission arrangement or a reflection arrangement, whichever is more desirable.

(1-5. Drive Controller)

The drive controller 17 includes a microcomputer and memory (not shown in the drawings), and drives, controls, and detects the components in the inspection apparatus 1, for example.

(2. Microchip)

The microchip 2 in the embodiment will now be described with reference to FIGS. 3A, 3B, and 3C.

Figure 3B:
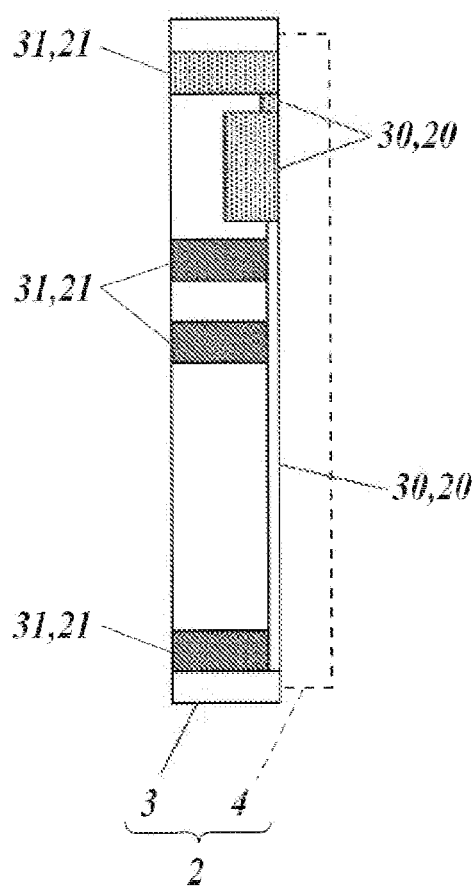
FIG. 3B This is a schematic view of a microchip, and a perspective side view illustrating an internal configuration of the microchip.
Figure 3C:
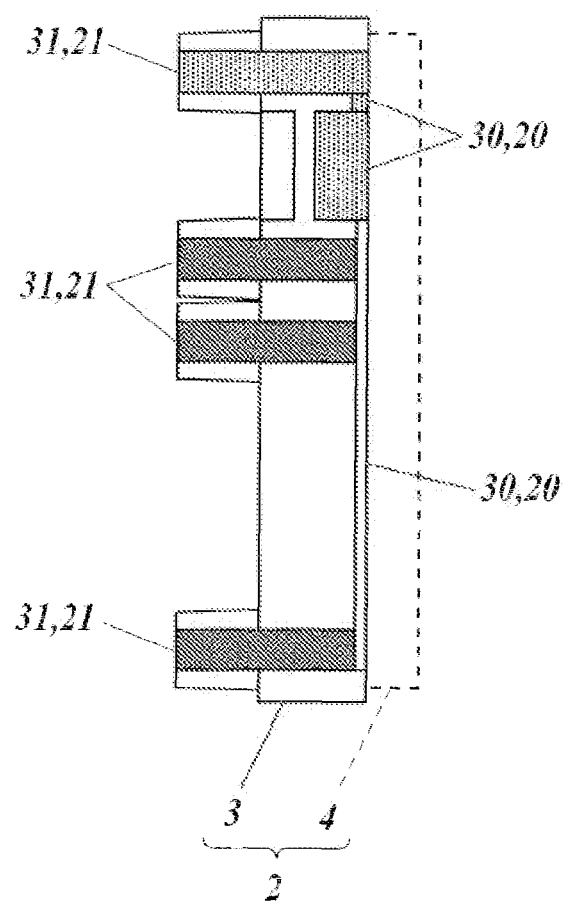
FIG. 3C This is a schematic view of a microchip, and a perspective side view illustrating an internal configuration of the microchip.

FIGS. 3A, 3B, and 3C illustrate the microchip 2. FIG. 3A is a plan view, whereas FIGS. 3B and 3C are perspective side views illustrating the internal configuration.

The microchip 2 includes a substrate 3 and a film 4 attached to each other, as illustrated in FIGS. 3A and 3B.

The substrate 3 has a fluid passage groove 30 on the surface bonded to the film 4 (hereinafter, referred to as inner side surface 3A). The fluid passage groove 30 forms a micro fluid passage 20 in cooperation with the film 4 that is bonded to the substrate 3. The micro fluid passage 20 is provided with the detection area 200 where the detection unit 16 of the inspection apparatus 1 detects a target substance. The micro fluid passage 20 (the fluid passage groove 30), though not limited to the following, preferably has width and depth both of which range from 10 to 200 μm so as to reduce the amounts of an analytical specimen and a reagent to be used and also to maintain the manufacturing accuracy, transfer characteristics, and releasability of a molding die. The width and depth of the micro fluid passage 20 may be determined depending on the intended use of the microchip. In addition, the micro fluid passage 20 may have a rectangular or rounded cross-section.

The substrate 3 has a plurality of through holes 31 across the thickness. The through holes 31 are formed at the ends of and halfway the fluid passage groove 30 and form openings 21 that link the micro fluid passage 20 to the exterior of the microchip 2 as a result of the substrate 3 being attached to the film 4. The openings 21 are connected to the chip connection section 141 (a tube or a nozzle) provided in the fluid delivering unit 14 of the inspection apparatus 1 for the introduction or discharge of a gel or liquid specimen, or buffer into or from the micro fluid passage 20. The openings 21 can also receive the electrodes (not shown in the drawings) of the voltage application unit 18 in the inspection apparatus 1. Note that the openings 21 (the through holes 31) may have any shape such as a circular or rectangular shape. Furthermore, the circumferences of the through holes 31 may be protrudent like tubes on the surface opposite to the inner side surface 3A of the substrate 3 (hereinafter, referred to as outer side surface 3B), as illustrated in FIG. 3C, in order to facilitate the connection of the chip connection section 141.

In addition, the substrate 3 has one or more positioning holes 32 (two positioning holes 32 in the present embodiment) used as reference for determining the position of the detection area 200 on the fluid passage groove 30.

Fixing pins (not shown in the drawings) of the inspection apparatus 1 are inserted into the positioning holes 32 to fix a position of the microchip 2 and thus a position of the detection area 200 to a predetermined position. The positioning holes 32 are provided at two corners of the substrate 3 so as to extend across the thickness direction.

Figure 4:
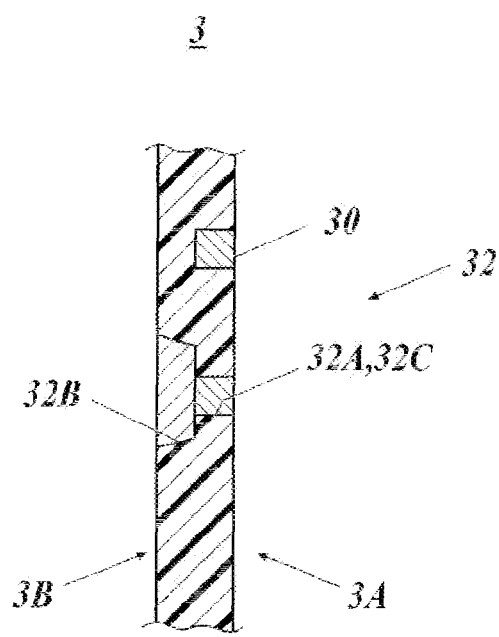
FIG. 4 This is a cross-sectional view of a positioning hole.

More specifically, as illustrated in FIG. 4, each of the positioning holes 32 is defined by a first recess 32A extending from the inner side surface 3A toward the outer side surface 3B and a second recess 32B extending from the outer side surface 3B toward the inner side surface 3A which communicate with each other in the substrate 3.

The first recess 32A has a constant inner diameter across the thickness of the substrate 3, and the inner diameter in the present embodiment is 2.0 mm. The first recess 32A corresponds to the smallest-diameter portion 32C of the positioning hole 32, and the position of the positioning hole 32 is determined on the basis of the smallest-diameter portion 32C. The depth of the first recess 32A is not less than 18 μm and not more than 0.5 mm. If the first recess 32A has a depth of smaller than 18 μm, it is difficult to fill in molten resin between a columnar protrusion for shaping the second recess 32B (i.e., a movable-die protrusion 606B described later) and a molding surface for shaping the inner side surface 3A (i.e., a fixed-die molding surface 605 described later), resulting in an irregular smallest diameter. If the first recess 32A has a depth of greater than 0.5 mm, the mold releasability is decreased, leading to deformation in the substrate 3.

The second recess 32B has an inner diameter greater than the inner diameter of the first recess 32A. In other words, the distal end of the second recess 32B (the end adjacent to the inner side surface 3A) has an inner diameter greater than the inner diameter of the distal end of the first recess 32A (the end adjacent to the outer side surface 3B).

In the embodiment, the first recess 32A has a constant inner diameter across the thickness of the substrate 3, whereas the second recess 32B is tapered toward its distal end. Alternatively, both the first and second recesses 32A and 32B may also be tapered for achieving high mold releasability. In addition, the positioning hole 32 preferably has a circular cross-section in order to facilitate the insertion of the positioning fixing pin into the positioning hole 32 and to prevent looseness of the fixing pin in the positioning hole 32; however, it may have a polygonal cross-sectional shape such as a triangular shape.

In the cross section orthogonal to the thickness direction of the substrate 3 (depth direction of the positioning holes 32), one of the two positioning holes 32 is preferably formed so that a diameter in the circumferential direction of the other positioning hole 32 is smaller than the diameter crossing the circumferential direction and is equal to the diameter of the other positioning hole 32. More preferably, one of the positioning holes 32 is formed such that the inner diameter in the direction toward the other positioning hole 32 (horizontal direction in FIG. 3A) is larger than the inner diameter in the orthogonal direction of the horizontal direction (vertical direction in the drawing). In such case, when fixing the position of the microchip 2 by fitting two fixing pins spaced apart at a fixed interval from each other to the positioning hole 32, accuracy of positioning is maintained, but the fitting of the fixing pins into the positioning holes 32 is easier.

The film 4 is a cover in the present invention and is in the form of sheet in the embodiment, as illustrated in FIGS. 3A, 3B, and 3C. Although the film 4 may also have a micro fluid passage or a hole, the film 4 is preferably relatively thin for the purpose of reliable bonding to the substrate 3. The electrodes of the voltage application unit 18 are inserted in the openings 21 (the through holes 31) for the application of voltage to run electrophoresis in a specimen contained in the micro fluid passage 20, as needed depending on the specimen, reagent, or inspection.

Figure 5A:
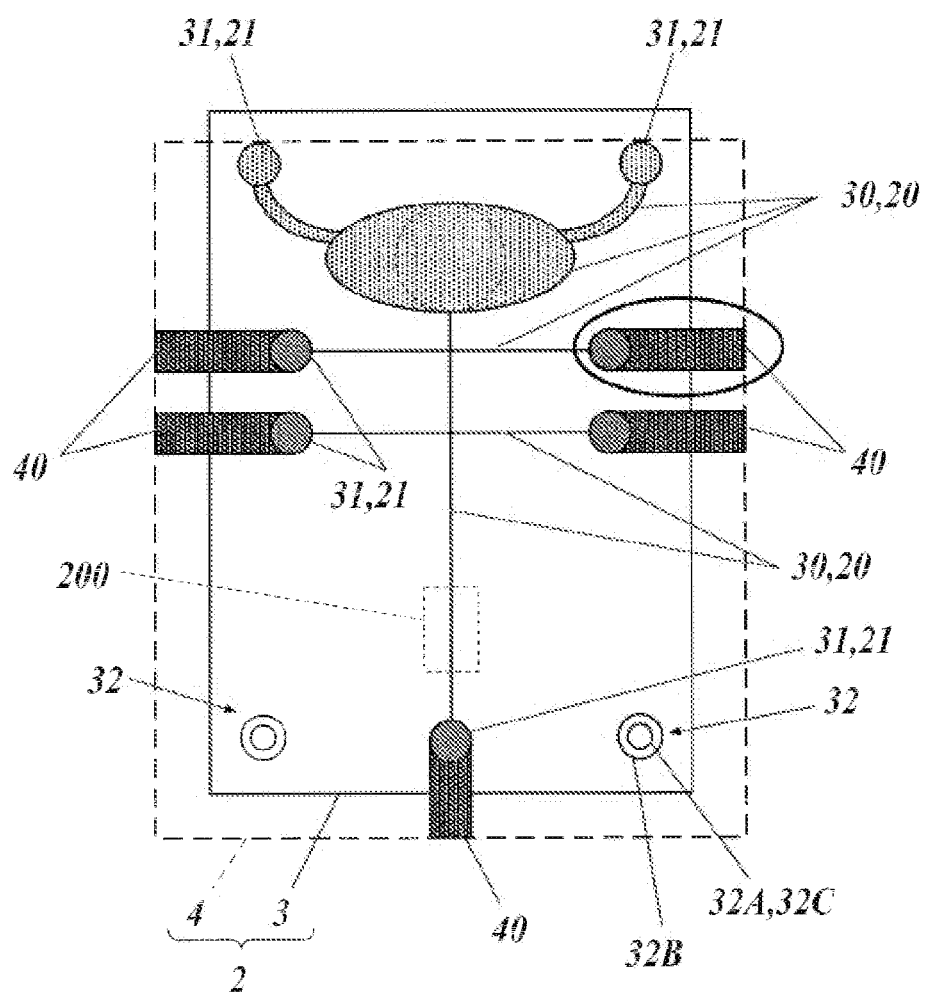
FIG. 5A This is a schematic plan view of a microchip.
Figure 5B:
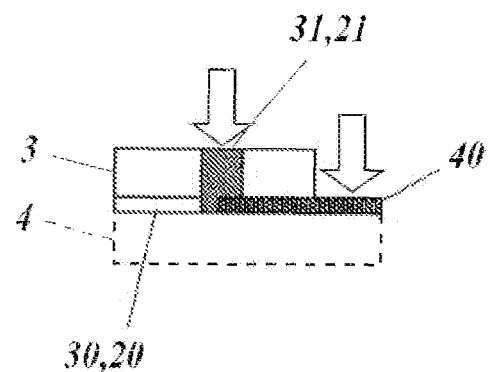
FIG. 5B This is a schematic view of a microchip, and a perspective side view illustrating an internal configuration of the microchip.
Figure 5C:
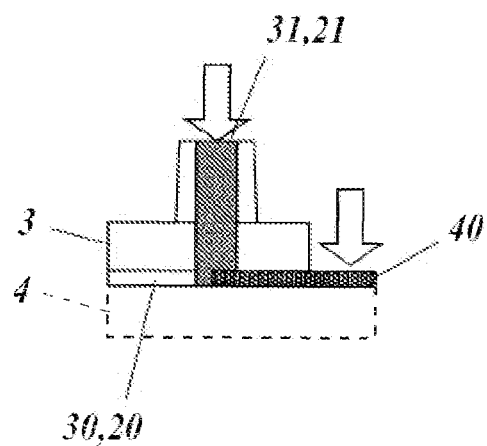
FIG. 5C This is a schematic view of a microchip, and a perspective side view illustrating an internal configuration of the microchip.
Figure 6A:
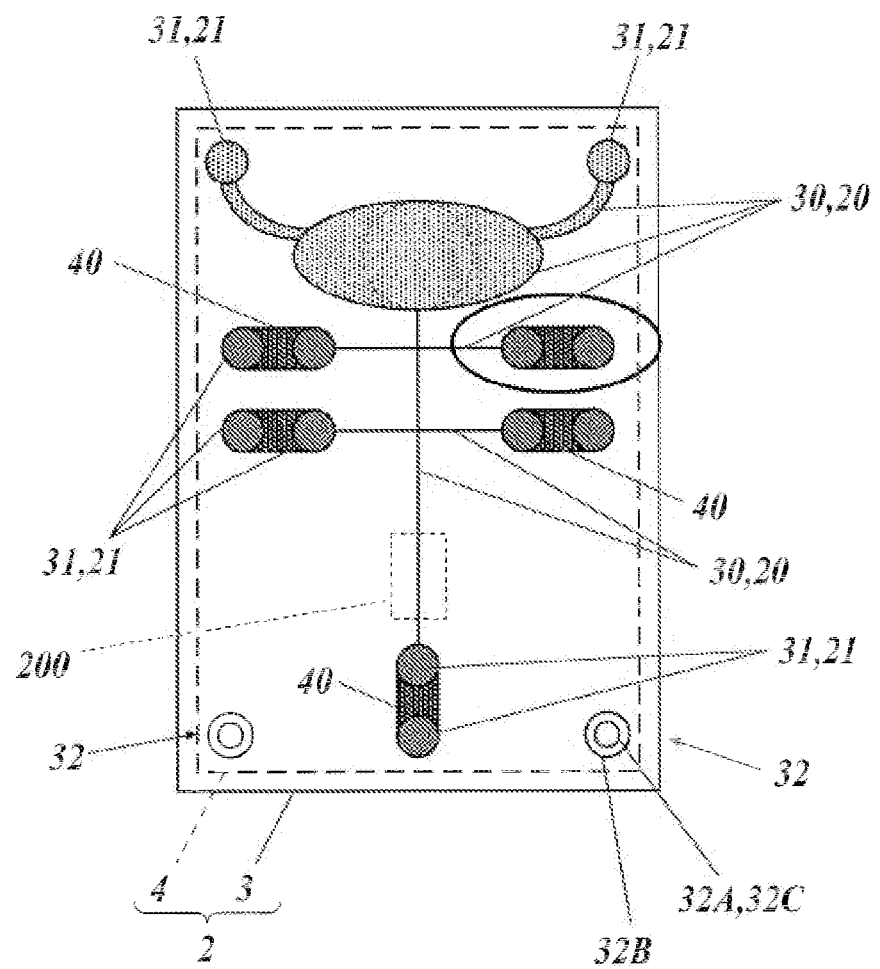
FIG. 6A This is a schematic plan view of a microchip.
Figure 6B:
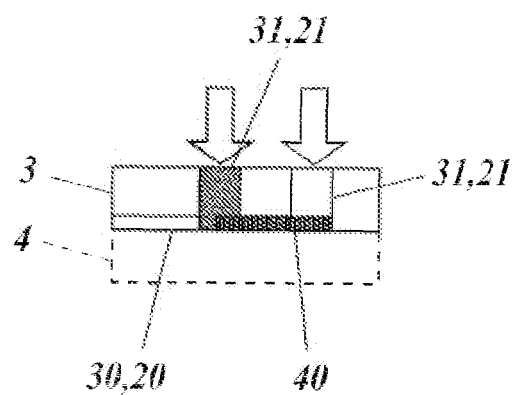
FIG. 6B This is a schematic view of a microchip, and a perspective side view illustrating an internal configuration of the microchip.
Figure 6C:
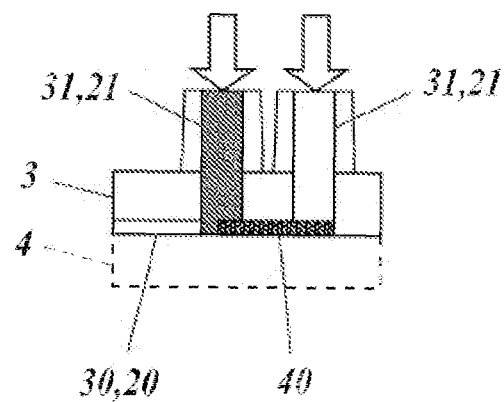
FIG. 6C This is a schematic view of a microchip, and a perspective side view illustrating an internal configuration of the microchip.

Note that the openings 21 may also have other positions and shapes, as illustrated in FIGS. 5A, 5B, 6A, and 6B, for example. FIGS. 5B and 6B are perspective views illustrating the inner configurations of bold-line encircled areas in FIGS. 5A and 6A, respectively. The microchip 2 in FIGS. 5A, 5B, and 5C has the conductive current-carrying portions 40 on a surface of the film 4 that face the substrate 3, ranging from the positions directly below the through holes 31 to edges of the film 4. The current-carrying portions 40 may be patterned on the film 4 by printing, for example. The microchip 2 having such an arrangement allows a voltage to be applied to a fluid in the micro fluid passage 20 at the edges of the film 4 via the energizing portions 40, without the insertion of electrodes into the through holes 31 (the openings 21) (see the right arrow in FIG. 5B). Thus, even when a plurality of the microchips 2 are used in sequence, it is possible to prevent liquid specimen from attaching to an electrode and thus coming into the next microchips 2. In the microchip 2 in FIGS. 6A, 6B, and 6C, the through holes 31 are provided alongside in the ends of the fluid passage groove 30 and in positions adjacent to the ends, respectively, and each of the current-carrying portions 40 is provided throughout the position facing the two adjacent through holes 31. The microchip 2 having such an arrangement allows a liquid specimen and such like to be supplied to and discharged from the through holes 31 (the openings 21) at the ends of the fluid passage groove 30 (see the left arrow in FIG. 6B) and also allows a voltage to be applied from the adjacent through holes 31 (the openings 21) to a fluid in the micro fluid passage 20 via the current-carrying portions 40 (see the right arrow in FIG. 6B). Thus, even when a plurality of the microchips 2 are be used in sequence, it is possible to prevent liquid specimen from attaching to an electrode and thus coming into the next microchips 2. Also in these cases, the circumferences of the through holes 31 may be protrudent like tubes from the outer side surface 3B of the substrate 3 to facilitate the connection of the chip connection section 141, as illustrated in FIGS. 5C and 6C.

The substrate 3 and the film 4 may have any profile that facilitates handling and analysis and is preferably a square or a rectangle in a plan view. The substrate 3 and the film 4 may range from 10 to 200 mm square as an example, and preferably from 10 to 100 mm square. Furthermore, the thickness of the substrate 3 having the fluid passage groove 30 preferably ranges from 0.2 to 5 mm, and more preferably from 0.5 to 2 mm in view of moldability. The thickness of the film 4 functioning as a lid (cover) for covering the fluid passage groove preferably ranges from 30 to 300 μm, and more preferably from 50 to 150 μm.

The substrate 3 and the film 4 are made from resin. The resin used for making the substrate 3 and the film 4 needs superior moldability (transfer characteristics and releasability), high transparency, and low autofluorescence property to ultraviolet rays and visible light. For example, the substrate 3 and the film 4 are made from thermoplastic resin. Preferred examples of the thermoplastic resin include polycarbonates, polymethyl methacrylate, polystyrene, polyacrylonitrile, polyvinyl chloride, polyethylene terephthalate, nylon 6, nylon 66, polyvinyl acetate, polyvinylidene chloride, polypropylene, polyisoprene, polyethylene, polydimethylsiloxane, and cyclic polyolefin. Especially, polycarbonates, polymethyl methacrylate, and cyclic polyolefins are preferred. Note that the substrate 3 and the film 4 may be made of the same material or different materials. Since the substrate 3 and the film 4 made of a similar material have compatibility with each other, they are readily bonded to each other after their fusion.

The substrate 3 and the film 4 are bonded together by heat fusion. The bonding is achieved by heating the substrate 3 and the film 4 using, for example, heated plates, hot air, a heating roller, ultrasound, vibrations, or a laser beam. As an example, a hot press device holds the substrate 3 and the film 4 between heated plates under pressure from the heated plates during a predetermined time period, thereby bonding the substrate 3 to the film 4. As a result, the film 4 functions as a lid (cover) for the fluid passage groove 30, and the fluid passage groove 30 and the film 4 form the micro fluid passage 20. The microchip 2 is thereby completed. Note that the heat fusion of the substrate 3 to the film 4 can be accomplished merely through heating of the interface therebetween, and the local heating of the interface can be achieved by using ultrasound, vibrations, or a laser beam.

(3. Manufacturing Apparatus of Microchip)

A manufacturing apparatus of the microchip 2 will now be described.

Figure 7:
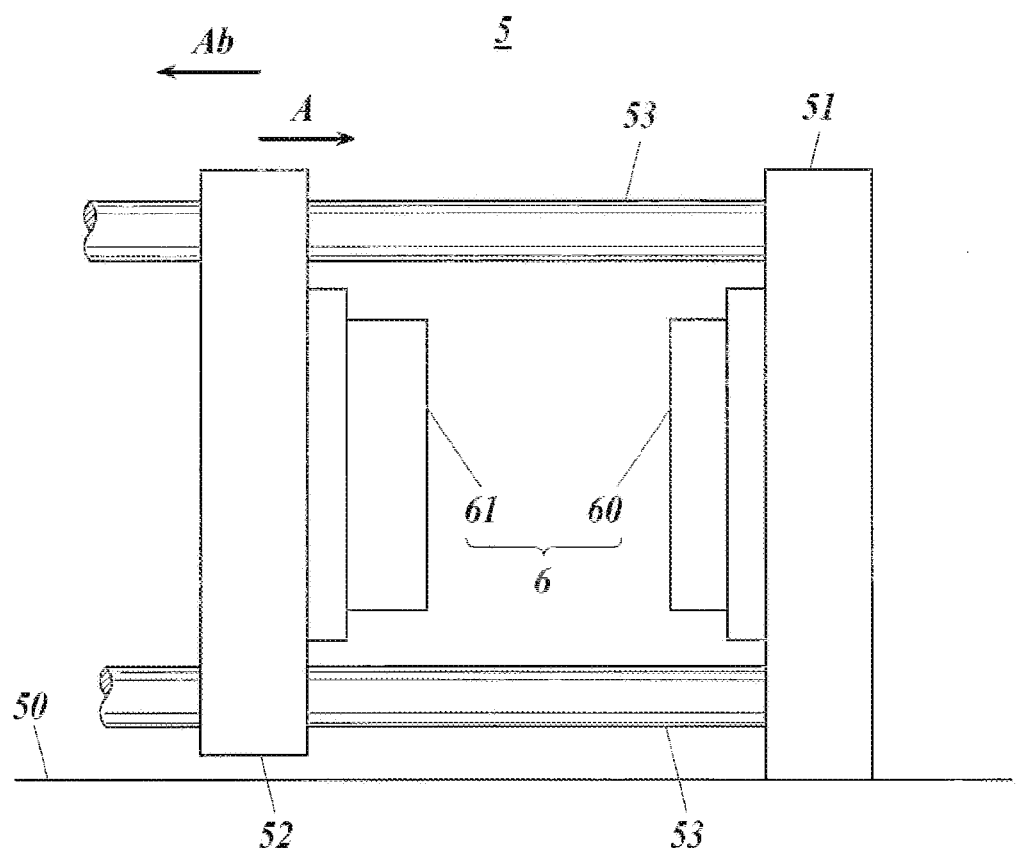
FIG. 7 This is a side view of a molding unit for a substrate.

The manufacturing apparatus of the microchip 2 produces the microchip 2 by forming the substrate 3 and the film 4 and bonding them to each other. The apparatus includes a molding unit 5 for the substrate 3, as illustrated in FIG. 7.

The molding unit 5 includes a fixed platen 51 on a base 50 and a movable platen 52. The fixed platen 51 is an upright flat plate extending from the base 50. Columnar tie bars 53 vertically extend from the four corners of the fixed platen 51. The movable platen 52 is a flat plate facing the fixed platen 51, and the four corners of the movable platen 52 are supported by the tie bars 53 provided on the fixed platen 51. The movable platen 52 is guided by the tie bars 53 and can be moved by a driving mechanism (not shown in the drawings) in the horizontal directions (the directions of arrows A and Ab in the drawing), namely, to and from the fixed platen 51.

A molding die 6 is disposed between the fixed platen 51 and the movable platen 52. The molding die 6 is clamped by the movable platen 52 moving in the direction of the arrow A;

whereas the molding die 6 is released by the movable platen 52 moving in the direction of the arrow Ab.

(3-1. Molding Die)

Figure 8:
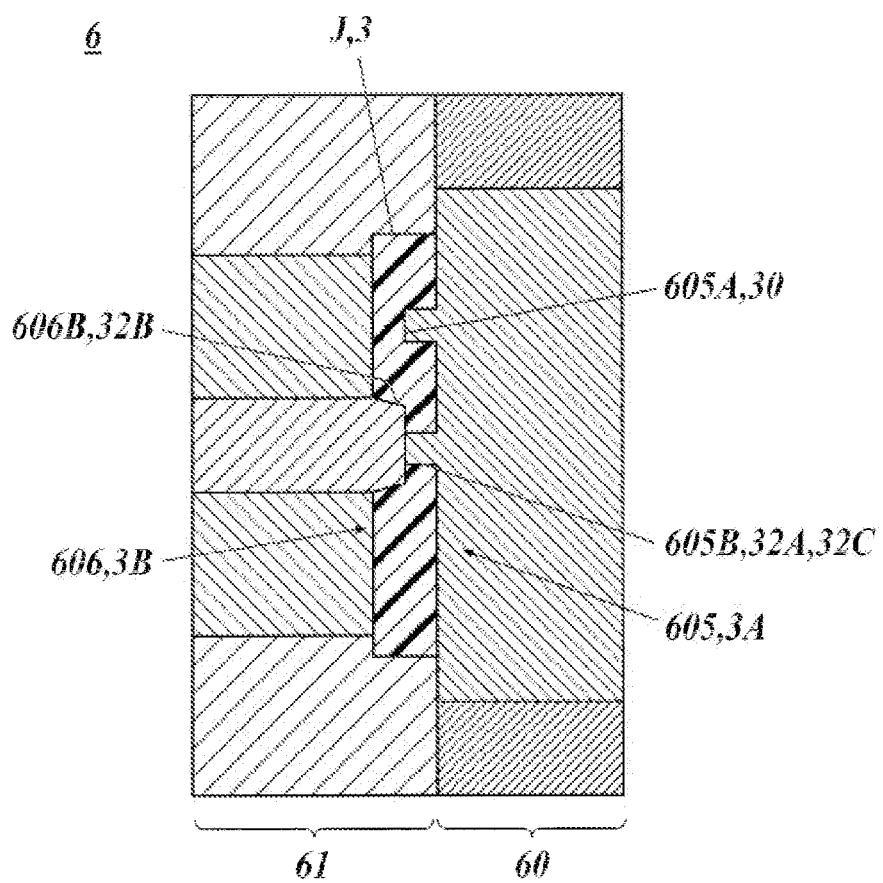
FIG. 8 This is a cross-sectional view of a molding die for a substrate.

FIG. 8 is a schematic cross-sectional view of the molding die 6 with the molding space being filled with resin.

The molding die 6 includes a fixed die 60 that is a first die and a movable die 61 that is a second die contactable with and separable from the fixed die 60, as illustrated in FIG. 8. The movable die 61 comes into contact with the fixed die 60 to form a molding space 64 therebetween for molding molten resin J into the form of the substrate 3. In the embodiment, the molding die 6 performs molding by injection molding. Specifically, a runner and a gate (not shown in the drawings) are provided between the fixed die 60 and the movable die 61, and the molding space 64 is filled with molten resin through the runner and gate. It should be noted that the molding die 6 may also be used in any molding method other than injection molding.

The fixed die 60 shapes the inner side surface 3A of the substrate 3 (the surface adjacent to the film 4) and is fixed to the fixed platen 51. The fixed die 60 has the fixed-die molding surface 605 for shaping the inner side surface 3A.

The fixed-die molding surface 605 has a ridge 605A that shapes the fluid passage groove 30 and two columnar fixed-die protrusions 605B, each of which shapes at least the first recess 32A of the positioning hole 32. Note that if one of the positioning holes 32 has a diameter in the circumferential direction of the other positioning hole 32, the diameter being smaller than the diameter crossing the circumferential direction, then the fixed-die protrusion 605B for shaping the former positioning hole 32 has a diameter in the circumferential direction, the diameter being smaller than the diameter crossing the circumferential direction. The inner and outer parts of the fixed die 60 are made from different materials in FIG. 8. Alternatively, these parts may be made from an identical material. The movable die 61 shapes the outer side surface 3B (the surface opposite to the inner side surface 3A) of the substrate 3 and is fixed to the movable platen 52. The movable die 61 has a movable-die molding surface 606 for shaping the outer side surface 3B.

The movable-die molding surface 606 has the two columnar movable-die protrusions 606B, each of which shapes at least the second recess 32B of the positioning hole 32 and faces the fixed-die protrusion 605B. The columnar movable-die protrusion 606B has a diameter larger than that of the fixed-die protrusion 605B and contacts with the distal end thereof to shape the positioning hole 32 in cooperation with the fixed-die protrusion 605B. Note that if one of the positioning holes 32 has a diameter in the circumferential direction of the other positioning hole 32, the diameter being smaller than the diameter crossing the circumferential direction, then the movable-die protrusion 606B for shaping the former positioning hole 32 has a diameter in the circumferential direction, the diameter being smaller than the diameter crossing the circumferential direction. The movable die 61 is also provided with an ejector pin (not shown in the drawings) that can emerge from the molding surface to release the molded article from the movable die 61. The inner and outer parts of the movable die 61 are made from different materials in FIG. 8. Alternatively, these parts may be made from an identical material.

The fixed die 60 and the movable die 61, each of which has the inner and outer parts as described above, advantageously allow for the replacement of only the inner part including microstructure such as a fluid passage, leading to reduced costs of the entire mold and flexible adaptation to variations in fluid passage configurations.

The molding die 6 as described above can be formed by using a negative die (master die) thereof by electroforming, for example. In such case, it is possible to prevent the positional relationship between the fluid passage groove 30 and the positioning holes 32 from changing every time the molding die 6 is replaced with another one.

(3-2. Manufacturing Method of Substrate)

A manufacturing method of the substrate 3 by using the molding die 6 will now be described.

The molten resin J is injected into the molding space 64 through the runner and gate and then compression-molded in the molding space 64. The molten resin J is thereby shaped into the substrate 3, which has the fluid passage groove 30 in the inner side surface 3A and the positioning holes 32 extending through the substrate across the thickness.

After the molded product is cooled to a predetermined temperature, the movable die 61 is separated from the fixed die 60 for the release of the molded product therefrom.

Next, the molded product is released from the movable die 61 by the ejector pin protruding from the movable die 61. Then, the molded part by the gate is cut off from the molded product to produce the substrate 3.

As described above, according to the embodiment, the substrate 3 has the fluid passage groove 30 on the inner side surface 3A and the positioning holes 32 for the fluid passage groove 30, the holes extending through the substrate across the thickness. Since the fixed die 60 for shaping the inner side surface 3A includes the ridge 605A for shaping the fluid passage groove 30 and the columnar fixed-die protrusions 605B for shaping at least the smallest-diameter portions 32C of the positioning holes 32, the same die (the fixed die 60) shapes the fluid passage groove 30 and the smallest-diameter portions 32C of the positioning holes 32, namely, the portions used to determine the positions of the positioning holes 32. Accordingly, the positional relationship between the fluid passage groove 30 and the smallest-diameter portions 32C of the positioning holes 32 can remain constant during the shots of molding; hence, the position of the detection area 200 on the micro fluid passage 20 can be accurately determined on the basis of the positions of the smallest-diameter portions 32C of the positioning holes 32. Thus, a conventional positioning fluid passage is not necessary, which can improve the flexibility of design for the substrate 3 while maintaining the capability of finding the position of the detection area 200. In addition, each measurement does not need a focusing or such like which is a process for determining the position of the detection area 200, and thus the control for the microchip 2 in use can be simplified to shorten inspection time.

Furthermore, the two positioning holes 32 formed in the substrate 3 lead to high-accuracy determination of the position of the fluid passage groove 30.

Additionally, since the movable die 61 includes the movable-die protrusion 606B which contacts with the distal end of the fixed-die protrusion 605B to shape the positioning hole 32 in cooperation with the fixed-die protrusion 605B, the positioning hole 32 can be molded under cooperation between the fixed-die protrusion 605B and the movable-die protrusion 606B. Thus, the heights of the protrusions can be reduced compared with a single protrusion for shaping the positioning hole 32. This can improve the mold releasability. The columnar movable-die protrusion 606B has a diameter larger than that of the fixed-die protrusion 605B. This can prevent a damage in the movable-die protrusion 606B or the fixed-die protrusion 605B caused by the contact between the corners of both the protrusions.

The movable die 61 includes the movable-die protrusion 606B having a diameter larger than that of the fixed-die protrusion 605B. This can improve the releasability from the fixed die 60 compared with a fixed die 60 which includes the movable-die protrusion 606B.

Note that the embodiment in which the present invention is applicable is not limited to the above-mentioned embodiment and can be modified as appropriate without departing from the gist of the present invention.

Figure 9:
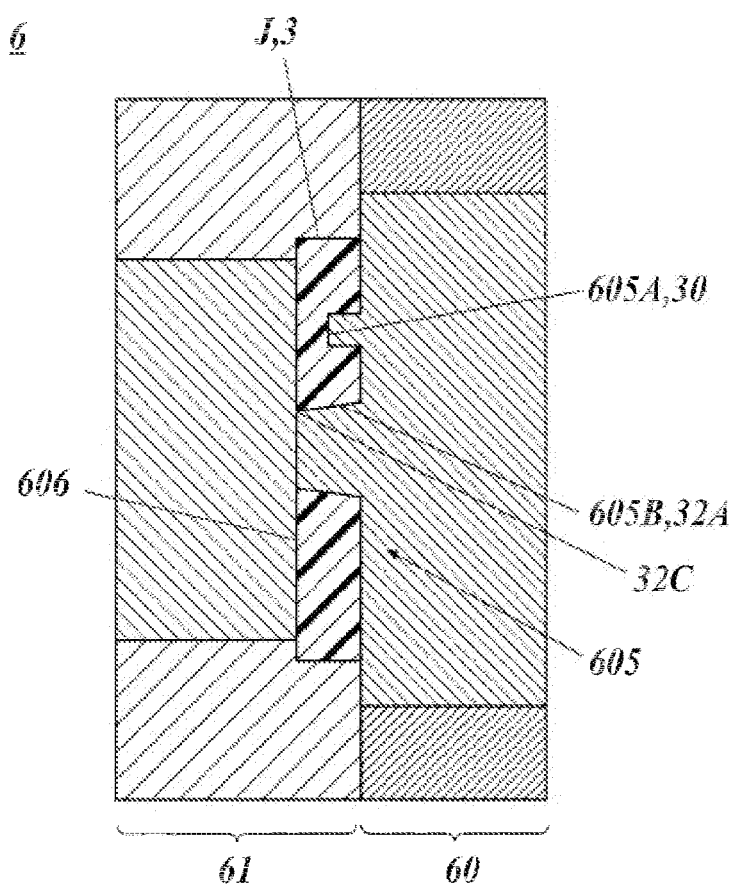
FIG. 9 This is a cross-sectional view of a modification example of a molding die for a substrate.

For example, in the above embodiment, the fixed die 60 shapes the fluid passage groove 30 and the first recess 32A on the inner side surface 3A; however, the movable die 61 may also shape these groove and recess. In the above embodiment, the positioning hole 32 is shaped under cooperation between the fixed-die protrusion 605B and the movable-die protrusion 606B; however, only one of the protrusions may shape the positioning hole, as illustrated in FIG. 9. It is noted that FIG. 9 illustrates the state in which only the fixed-die protrusion 605B shapes the positioning hole 32.

Furthermore, in the above embodiment, the positioning hole 32 extends through the substrate 3 so as to include the first recess 32A and the second recess 32B. However, only the first recess 32A may extend from the inner side surface 3A across the thickness. In this case, the molding die 6 is provided with only one of the fixed-die protrusion 605B and the movable-die protrusion 606B for shaping the first recess 32A.

Note that the entire disclosure of Japanese Patent Application No. 2010-243639, filed on Oct. 29, 2010, including Description, Claims, Drawings, and Abstract is herein incorporated in its entirety.

INDUSTRIAL APPLICABILITY

As described above, the present invention is suitable for providing a microchip, a molding die for the microchip, and a microchip manufacturing apparatus that allow for determination of a position of an observation fluid passage and improvement in the flexibility of design.

EXPLANATION OF REFERENCE NUMERALS 2 microchip
3 substrate
4 film (cover)
6 molding die
3A inner side surface (one surface)
3B outer side surface (the other surface)
30 fluid passage groove
32 positioning hole (hole)
32A first recess
32B second recess
60 fixed die (first die)
61 movable die (second die)
605B fixed-die protrusion (first protrusion)
606B movable-die protrusion (second protrusion)

The invention claimed is:
1. A molding die for molding a substrate to be included in a microchip, the molding die comprising:
a first die; and
a second die contactable with and separable from the first die, wherein the first die and the second die have structure so that in the substrate molded by the first die and the second die a fluid passage groove is formed on one surface of the substrate and a hole as a positioning reference for the groove is formed in the substrate so as to extend from the one surface across a thickness direction of the substrate, the microchip is formed by attaching a cover to the one surface, and
wherein the first die molds the one surface and comprises:
a ridge for molding the groove; and
a columnar first protrusion for molding at least a smallest diameter portion of the hole, the portion having the smallest inner diameter, and
wherein the second die comprises a second protrusion which is formed to be columnar having a diameter larger than a diameter of the first protrusion and has a distal end that contacts with a distal end of the first protrusion to mold the hole so as to extend through the substrate in cooperation with the first protrusion, wherein a diameter of the distal end of the second protrusion is greater than a diameter of the distal end of the first protrusion.

2. The molding die of claim 1, wherein the first die is stationary and the second die is movable relative to the first die.

3. The molding die of claim 1, wherein the first die comprises:
a columnar third protrusion for molding at least a smallest diameter portion of a second hole, the portion having the smallest inner diameter, and
wherein the second die comprises a fourth protrusion which is formed to be columnar having a diameter larger than a diameter of the third protrusion and contacts with a distal end of the third protrusion to mold the second hole so as to extend through the substrate in cooperation with the third protrusion.

4. The molding die of claim 3, wherein the first protrusion is formed to have a diameter in a circumferential direction of the third protrusion so that the diameter of the first protrusion is smaller than a diameter crossing the circumferential direction of the third protrusion and equal to a diameter of the third protrusion, in a cross section orthogonal to a longitudinal direction of the first protrusion, and wherein the second protrusion has a diameter in a circumferential direction of the fourth protrusion so that the diameter is smaller than a diameter crossing the circumferential direction of the fourth protrusion and equal to a diameter of the fourth protrusion, in a cross section orthogonal to a longitudinal direction of the second protrusion.

5. A microchip manufacturing apparatus for manufacturing a microchip having a substrate and a cover attached thereto, comprising:
a first platen;
a second platen, wherein the first platen and the second platen are movable relative to one another; and
a molding die positioned between the first platen and the second platen, wherein the molding die comprises:
a first die; and
a second die contactable with and separable from the first die, wherein the first die and the second die have structure so that in the substrate molded by the first die and the second die a fluid passage groove is formed on one surface of the substrate and a hole as a positioning reference for the groove is formed in the substrate so as to extend from the one surface across a thickness direction of the substrate, the microchip is formed by attaching a cover to the one surface, and
wherein the first die molds the one surface and comprises:
a ridge for molding the groove; and
a columnar first protrusion for molding at least a smallest diameter portion of the hole, the portion having the smallest inner diameter, and
wherein the second die comprises a second protrusion which is formed to be columnar having a diameter larger than a diameter of the first protrusion and contacts with a distal end of the first protrusion to mold the hole so as to extend through the substrate in cooperation with the first protrusion, wherein a diameter of a distal end of the second protrusion is greater than a diameter of the distal end of the first protrusion.

6. A microchip comprising:
a cover; and
a substrate, wherein the cover is attached to the substrate, and
wherein the substrate comprises:
    a first surface on which a fluid passage groove is formed; and
    a hole formed in the substrate and is a positioning reference for the groove, wherein the hole extends through the substrate across a thickness direction of the substrate
the hole is formed by a first recess and a second recess communicating with each other, the first recess extending from the first surface of the substrate toward a second surface of the substrate, the second recess extending from the second surface toward the first surface,
wherein an inner diameter of the second recess is larger than an inner diameter of the first recess, and an inner diameter of an end of the second recess, which is adjacent to an end of the first recess, is greater than an inner diameter of the end of the first recess.

7. The microchip of claim 6, wherein the substrate comprises a second hole formed in the substrate and is a second positioning reference for the groove, wherein the second hole extends through the substrate across a thickness direction of the substrate.

8. The microchip of claim 7, wherein the hole has a diameter in a circumferential direction of the second hole so that the diameter of the hole is smaller than a diameter crossing the circumferential direction of the second hole and equal to a diameter of the second hole, in a cross section orthogonal to a depth direction of the hole.

9. A microchip comprising:
a cover; and
a substrate, wherein the cover is attached to the substrate, and
wherein the substrate comprises:
    a first surface on which a fluid passage groove is formed; and
    a hole formed in the substrate and is a positioning reference for the groove, wherein the hole extends through the substrate across a thickness direction of the substrate, and the hole is formed by a first recess and a second recess communicating with each other, the first recess extending from the first surface of the substrate toward a second surface of the substrate, the second recess extending from the second surface toward the first surface,
wherein an inner diameter of the second recess is larger than an inner diameter of the first recess, and an inner diameter of the hole changes discontinuously at a portion of the substrate where the first and second recesses are connected to each other.

\* \* \* \* \*